Jan. 26, 1943.      A. A. SCARLETT      2,309,257
WHEEL MOUNTING
Filed July 14, 1941

Inventor
Arthur A. Scarlett.
By Paul O. Pippel
Att'y.

Patented Jan. 26, 1943

2,309,257

UNITED STATES PATENT OFFICE 2,309,257

WHEEL MOUNTING

Arthur A. Scarlett, Hamilton, Ontario, Canada, assignor, by mesne assignments, to International Harvester Company, Chicago, Ill., a corporation of New Jersey Application July 14, 1941, Serial No. 402,298

4 Claims. (Cl. 301—9)

This invention relates to wheel mountings. More particularly the invention is concerned with means for securing a wheel hub on a wheel box without finishing the mating parts of the wheel box and hub to insure their assembly.

In agricultural machines and the like, it is necessary many times to replace the wheels provided thereon. Ordinarily, the implement is provided with bearing-mounted wheel boxes which last the life of the implement. However, the wheels that are mounted on these wheel boxes become worn with use and must be replaced. It has been somewhat of a problem to supply repair wheels for these implements that will always fit the wheel box. It has been necessary to finish the mating portions of the wheel box and wheel hub to close dimensions so as to insure their fit.

It is, therefore, an important object of the present invention to provide an improved wheel mounting.

Another object of the present invention is to provide a wheel box and wheel hub construction which can be quickly and easily assembled.

Another object of the present invention is to provide a wheel mounting which does not require that the mating parts of the wheel box and wheel hub be finished to close dimensions.

According to the present invention, the implement is provided with bearing-mounted wheel boxes which consist of a radial flange and a conical portion having spaced longitudinal grooves. The hub of the wheel is provided with an opening that is somewhat larger than the outer diameter of the conical portion, so that the hub may be easily inserted over the conical portion. The wheel hub is bolted to the radial flange, and flat springs are inserted in the longitudinal grooves so as to carry the load on the wheel box. The springs also compensate for the difference in diameters of the wheel box and wheel hub.

These and other objects and advantages of the present invention will be apparent to those skilled in the art after a consideration of the following detailed description of the preferred structural embodiment, taken in conjunction with the accompanying drawing.

Figure 1:
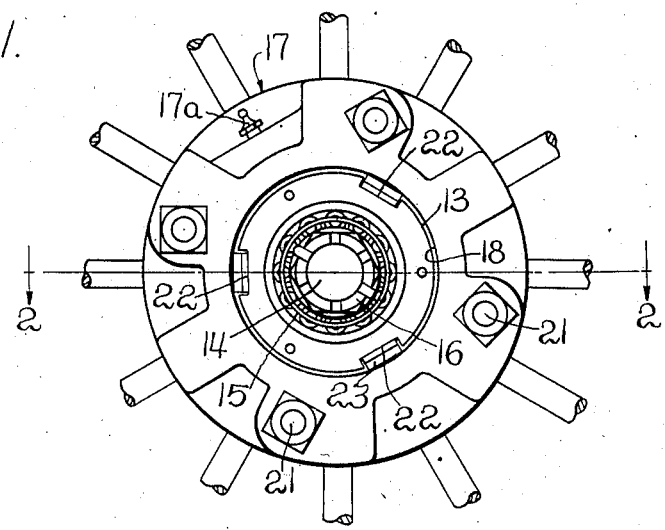
Figure 1 is an end view of the novel wheel hub and wheel box mounting.
Figure 2:
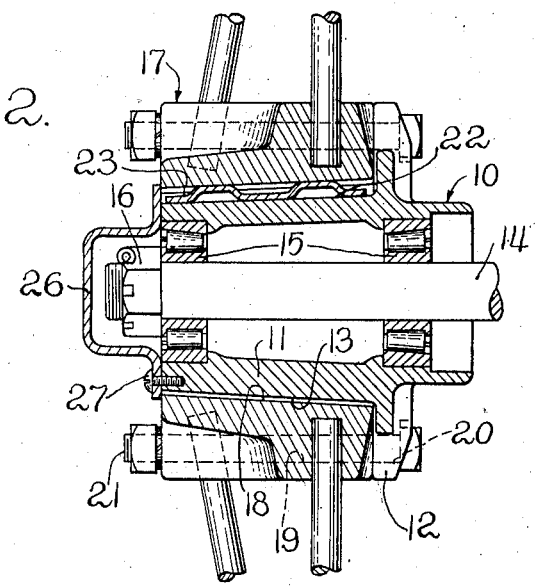
Figure 2 is a sectional view taken along the line 2—2 of Figure 1.

Referring now to the drawing, it will be seen that the novel wheel mounting comprises a wheel box 10 which consists of a conical portion 11, from one end of which extends a radial flange 12. The periphery 13 of the conical portion 11 tapers outwardly from the radial flange 12. The wheel box 10 is journaled on an axle 14 by means of roller bearings 15 which are held on the axle 14 by a nut 16.

The wheel box 10 and the bearings 15 most generally last the life of the implement. A suitable lubrication means 17a is provided in the hub 17, by which the bearings 15 are lubricated.

The wheel hub 17, in which an opening 18 is provided of a diameter greater than the outer diameter or periphery 13 of the conical portion 11, is inserted over the periphery 13. The opening 18 is tapered so as to match the conical portion 11. The hub 17 is provided with four equally spaced openings 18 that are arranged parallel to the axle 14. Alined openings 20 are provided in the radial flange 12. Bolts 21, inserted in the openings 18 and 20, secure the hub 17 to the radial flange 12. It is to be noted that a considerable space is provided between the periphery 13 of the conical portion 11 and the diameter of the opening 18 in the wheel hub 17. By this construction, the wheel hub may be quickly and easily mounted on the wheel box. If desired, the face of the radial flange 12 and the end of the wheel hub 17 may be finished to insure even rotation of the wheel.

Figure 3:
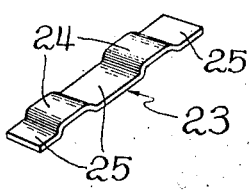
Figure 3 is a perspective view of one of the springs which carry the load of the wheel on the wheel box.

The weight or load, however, cannot be carried on the bolts 21. Therefore, a novel load-carrying means is provided, by which the load is carried directly on the periphery 13 of the wheel box 10. The periphery 13 is provided with three equally spaced longitudinal grooves 22 into which a flat spring 23 is inserted. The spring 23, shown in Figure 3, is provided with a plurality of raised portions 24 which extend from the base portions 25. After the hub 17 is bolted to the radial flange 12, the flat springs 23 are driven into the longitudinal grooves 22. The springs 23 are under compression and carry the load of the wheel on the conical portion 11. A cap 26 is secured to the end of the conical portion 11 by machine screws 27 to retain the springs 23 in place. The cap 26 also keeps dirt out of the bearings 15.

From the foregoing description it should be apparent that a novel wheel mounting has been provided by this arrangement of parts. Sufficient space is provided between the wheel hub and the wheel box so that the wheel may be readily mounted thereon. The bolts secure the wheel hub to the wheel box, and the load is carried on the conical portion of the wheel box by means of springs which are inserted between the wheel box and wheel hub. The wheel box and wheel hub are easy and economical to manufacture, since the parts need not be finished to close dimensions.

While only a preferred construction embodying the principles of the present invention has been herein chosen and described, it is to be understood that the invention is not to be limited to the specific details shown and described but that, in fact, widely different means may be employed in the broader aspects of this invention.

What is claimed is:

1. In a wheel mounting, an axle, a wheel box journaled for rotation on the axle, said wheel box having a peripheral flange, a wheel having a hub portion provided with an opening that is inserted over the wheel box, means for securing the hub to the radial flange, and a plurality of leaf spring means inserted between the wheel box and the hub for carrying the load on said wheel box.

2. In a wheel mounting, an axle, a wheel box journaled for rotation on the axle, said wheel box having a radial flange, a wheel having a hub portion provided with an opening that is inserted over the wheel box, bolt means securing the hub to the peripheral flange, and a plurality of leaf spring means inserted between the wheel box and the hub for carrying the load on said wheel box.

3. In a wheel mounting, an axle, a wheel box journaled for rotation on the axle, said wheel box having a conical portion at one end of which extends a radial flange, said conical portion having a plurality of longitudinal grooves, a wheel having a hub portion provided with an opening that is inserted over the conical portion of the wheel box, bolt means securing the hub to the peripheral flange, and a leaf spring inserted in each of said longitudinal grooves and adapted to contact the opening in the hub portion to carry the load on said wheel box.

4. In a wheel mounting, an axle, a wheel box journaled for rotation on the axle, said wheel box having a conical portion at one end of which extends a radial flange, said conical portion having three spaced longitudinal grooves, a wheel having a hub portion provided with an opening that is inserted over the conical portion of the wheel box, bolt means securing the hub to the peripheral flange, and a leaf spring inserted in each of said longitudinal grooves and adapted to contact the opening in the hub portion to carry the load on said wheel box.

ARTHUR A. SCARLETT.